(12) United States Patent
Wang et al.

(10) Patent No.: US 8,297,861 B2
(45) Date of Patent: Oct. 30, 2012

(54) KEYPAD WITH LARGER KEY AREAS IN CENTRAL KEY GROUP

(75) Inventors: John C. Wang, Taoyuan (TW); Yi-Shen Wang, Taoyuan (TW); Yi-Chi Lin, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 1191 days.

(21) Appl. No.: 12/127,037

(22) Filed: May 27, 2008

(65) Prior Publication Data
US 2008/0297377 A1  Dec. 4, 2008

(30) Foreign Application Priority Data
May 28, 2007  (TW) .............................. 96119043 A

(51) Int. Cl.
G06F 3/02 (2006.01)
(52) U.S. Cl. ....................................... 400/489; 400/472
(58) Field of Classification Search .................. 400/472, 400/489, 486
See application file for complete search history.

(56) References Cited

U.S. PATENT DOCUMENTS

| | | | | |
|---|---|---|---|---|
| 5,360,280 A | * | 11/1994 | Camacho et al. | 400/489 |
| 7,199,786 B2 | * | 4/2007 | Suraqui | 345/168 |
| 2006/0022947 A1 | * | 2/2006 | Griffin et al. | 345/168 |
| 2007/0238489 A1 | * | 10/2007 | Scott | 455/566 |
| 2008/0075517 A1 | * | 3/2008 | Vuong | 400/486 |
| 2008/0094362 A1 | * | 4/2008 | Lee | 345/168 |
| 2008/0205960 A1 | * | 8/2008 | Siddeeq | 400/489 |

FOREIGN PATENT DOCUMENTS

| | | |
|---|---|---|
| TW | M304728 | 1/2007 |
| WO | WO 97/27529 | 7/1997 |
| WO | WO 2007/056406 | 5/2007 |

OTHER PUBLICATIONS

English language translation of abstract of TW M304728 (published Jan. 11, 2007).

* cited by examiner

Primary Examiner — Daniel J Colilla
(74) Attorney, Agent, or Firm — ThomaslKayden

(57) ABSTRACT

An electronic device and a keypad structure thereof are disclosed. The keypad structure includes a first key group, a second key group and a third key group. The second key group is disposed on the left side of the first key group, and the third key group is disposed on the right side of the first key group. Each key area of the second key group is smaller than that of the first key group, and each key area of the third key group is also smaller than that of the first key group.

18 Claims, 3 Drawing Sheets

KEYPAD WITH LARGER KEY AREAS IN CENTRAL KEY GROUP

This application claims the benefit of Taiwan application Serial No. 96119043, filed May 28, 2007, the subject matter of which is incorporated herein by reference.

BACKGROUND OF THE INVENTION

1. Field of the Invention

The invention relates in general to a keypad structure, and more particularly to a keypad structure having different key areas.

2. Description of the Related Art

With the development of technology, the tendency of many companies is to provide users with multi-functional electronic devices that meet the user's requirements. In addition, to facilitate the operation of the electronic device for the user, most electronic devices, such as handheld devices, laptop computers, tablet computers, or ultra-mobile personal computers (UMPC), are designed based on the concept of the personal computer.

The conventional keypad structure of an electronic device is composed of many keys with the same key area. As electronic devices are reduced in size, the size of the keypad structure must be reduced as well. When the size of the keypad structure is reduced, the area for each key is getting smaller, and it becomes inconvenient for a user to press the keys. Moreover, when the user holds the electronic device with both hands and presses the keys with both thumbs, some keys, especially those in the middle area of the keypad, are not easy to reach. The user has to stretch his/her thumbs to press those keys, and it increases the difficulty and reduces the accuracy of inputting certain characters in the electronic device.

SUMMARY OF THE INVENTION

It is therefore an object of the invention to provide a keypad structure and an electronic device using the same. The keypad structure and the electronic devices have some keys that are not easy to press and some keys that are easier to press. The keys that are not easy to press have larger area than the keys that are easier to press; it makes the thumbs moving and inputting characters more easily and correctly.

The invention achieves the above-identified object by providing a keypad structure that is used in an electronic device and includes a first key group, a second key group, and a third key group. The second key group is on the left side of the first key group, and the third key group is on the right side of the first key group. Each key area of the second key group and the third key group is smaller than each key area of the first key group.

The invention achieves the above-identified object also by providing an electronic device that includes a main body and a keypad structure. The keypad structure includes a first key group, a second key group, and a third key group. The second key group is on the left side of the first key group, and the third key group is on the right side of the first key group. Each key area of the second key group and the third key group is smaller than each key area of the first key group.

Other objects, features, and advantages of the invention will become apparent from the following detailed description of the preferred but non-limiting embodiments. The following description is made with reference to the accompanying drawings.

DETAILED DESCRIPTION OF THE INVENTION

A keypad structure and an electronic device using the same are disclosed. The keypad structure has a first key group, a second key group, and a third key group. The second key group is on the left side of the first key group, and the third key group is on the right side of the first key group. In addition, each key area of the second key group and the third key group is smaller than that of the first key group. The keypad structure with different key area provides more convenience and accuracy to the user to move the thumbs on the keys than the conventional keypads.

Figure 1:
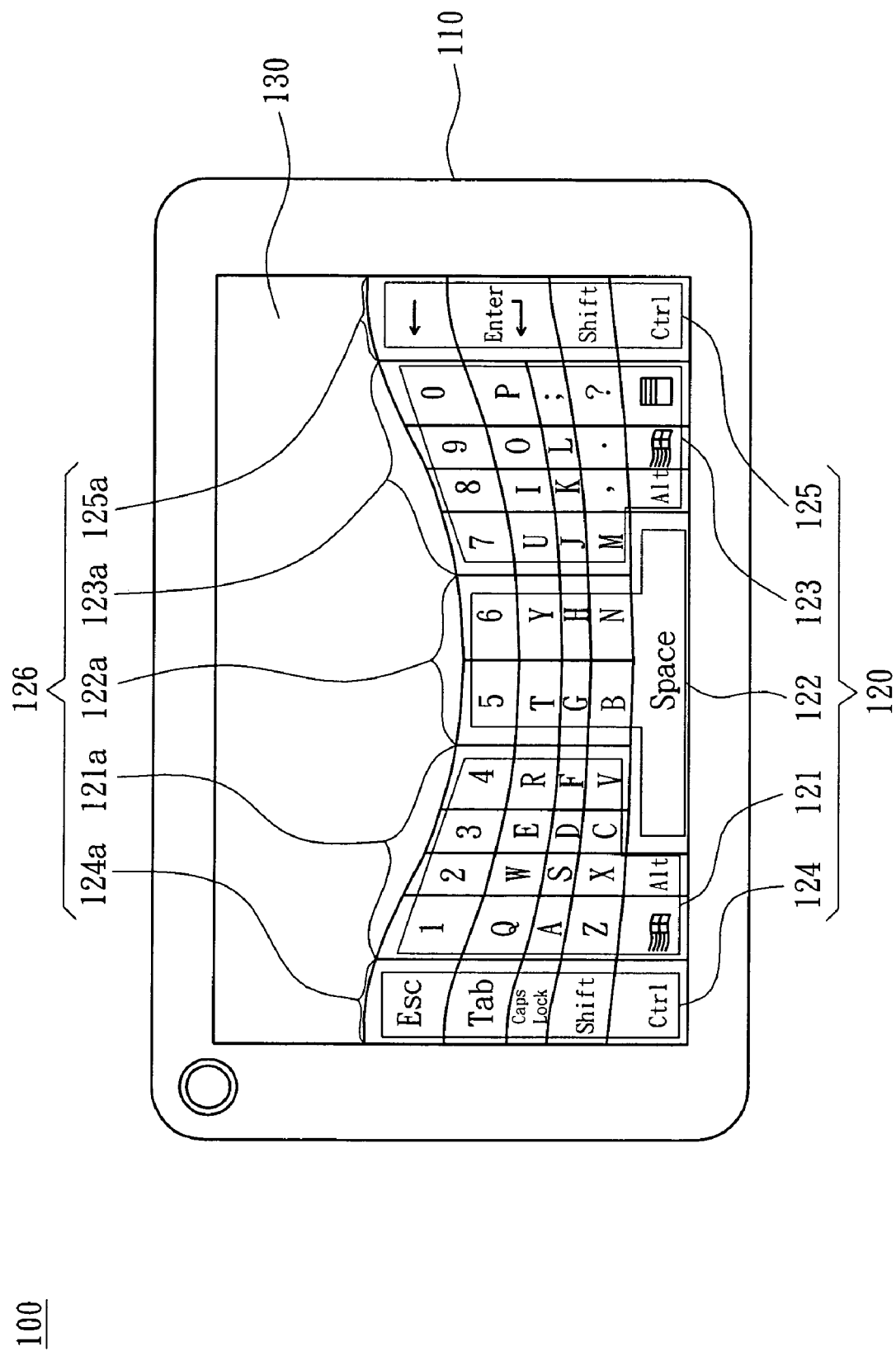
FIG. 1 is a diagram showing an electronic device according to a preferred embodiment of the invention.

FIG. 1 presents a diagram showing an electronic device according to a preferred embodiment of the invention. Electronic device 100 includes a main body 110, a keypad structure 120 and a display 130. In the present embodiment of the invention, the display 130 is, for example, a touchpad display, and the keypad structure 120 is, for example, a keypad shown in the touchpad display. The keypad structure 120 includes keys that are divided into a first key group, a second key group, and a third key group. In the present embodiment, the first key group, referred to as central key group 122, is substantially in the middle of the keypad structure 120. The second key group, referred to as left key group 121 for example, is on the left side of the central key group 122. The third key group, referred to as right key group 123 for example, is on the right side of the central key group 122. The key areas of some of the keys in the left key group 121 and some of the keys in the right key group 122 are smaller than the key areas of the central key group 122.

When a user holds the electronic device 100 with both hands, the left thumb and the right thumb are positioned around the left key group 121 and the right key group 123, respectively. Since the keys of the left key group 121 and the right key group 123 are closer to the thumbs than the keys of the central key group 122, the user can easily press the keys of the left key group 121 and the right key group 123 with the tips of the thumbs. However, when the user intends to press the keys of the central key group 122, which are farther from the thumbs than the keys of the left key group 121 and the right key group 123, the user has to stretch the thumbs to press those keys. It increases the difficulty and reduces the accuracy of inputting the characters of the keys of the central group 122. Due to the larger keys of the central key group 122, the user can easily input characters by the central key group 122 as long as the edge of the key of the central key group 122 are pressed. Thus, the simplicity and accuracy of inputting the keys of the central key group 122 are increased.

At present, a standard QWERTY keyboard is commonly used as an input device for electronic devices such as laptop or desktop computers, personal digital assistants (PDA), ultra-mobile personal computers (UMPC), etc. Therefore, the keys of the left key group 121, the central key group 122, and the right key group 123 are arranged according to the standard QWERTY keyboard in the present embodiment for providing the user with the familiar input device. However, the arrangement of the keys is not limited to the standard QWERTY keyboard, and any other keyboard arrangements can also be used for the keypad structure 120. In addition, the keypad structure 120 can be used for inputting characters, numbers, and symbols. The keypad structure can be used for inputting different language comprising English, Chinese, Japanese, etc.

In the present embodiment, the central key group 122 is illustrated by two columns, which includes, for example, the keys 5, 6, T, Y, and other keys, but the number of columns in the central key group of the invention is not limited thereto. Moreover, the central key group 122 is substantially in the middle of the keypad structure 120, and the left key group 121 and the right key group 123 are on left side and the right side of the central key group 121, respectively. The left key group 121 and the right key group are preferably symmetrical with each other for enhancing the aesthetic appearance and enhancing the balance the keypad structure 120 for pressing the keys with both hands.

The electronic device 100 further includes a fourth key group and a fifth key group for enhancing the usability of the keypad structure 120. In the present embodiment, the fourth key group is a left-most key group 124 and the fifth key group is a right-most key group 125. The left-most key group 124 is on the left side of the left key group 121, and the central key group 122 is on the right side of the left key group 121. The right-most key group 125 is on the right side of the right key group 123, and the central key group 122 is on the left side of the right key group 123.

The key area of the left-most key group 124, which includes, for example, the keys Esc, Tab, and others, is larger than the key area of the left key group 121, which includes, for example, the keys 1, 2, 3, 4, and others. Comparing to the left key group 121, the left-most key group 124 is too close to the left edge of the electronic device 100, so it is inconvenient for the user to press the keys of the left-most key group 124 by using the left thumb. It is harder for the user to press the keys of the left-most key groups 124 by using the fingertip of the left thumb, and the user usually needs to use the finger pad of the thumb to press those keys. As the key area of the left-most key group 124 is enlarged, it will reduce the difficulty of pressing those keys even the user uses the finger pad to press the keys. Also, the user can press the keys more precisely.

Similarly, the key area of the right-most key group 125, which includes, for example, the keys ←, Enter, and others, is larger than the key area of the right key group 123, which includes, for example, the keys 7, 8, 9, 0, and others. Comparing to the right key group 123, the right-most key group 125 is too close to the right edge of the electronic device 100, so it is inconvenient for the user to press the keys of the right-most key group 125 by using the right thumb. It is harder for the user to press the keys of the right-most key groups 125 by using the fingertip of the right thumb, and the user usually needs to use the finger pad of the thumb to press those keys. As the right-most key group 125 is enlarged, the user can press the keys more easily and precisely.

The difference in key area, of which the key area of the left key group 121 and/or the right key group 123 is the smallest and the key area of the central key group 121 is the largest, is based on the manner in which a user holds a handheld electronic device. When a user holds a handheld electronic device naturally, the left thumb and the right thumb are placed on the left key group 121 and the right key group 123, respectively. Therefore, the keys of the left key groups 121 and the right key groups 123 are the easiest keys for the user to press, and the keys of the central key group 121 are a bit more difficult to press. According to the invention, since each key in the central key group 121 has a larger key area, the situation stated above is largely ameliorated.

Preferably, the difference in size between the key areas of any two adjacent keys can be reduced so as to enhance the aesthetic appearance of the keypad structure 120. Moreover, the central key group 122 adjoins the left key group 121 and the right key group 123, and the gap between any two adjacent keys is minimized so that the keypad structure 120 is similar to a continuous keyboard.

The left and right thumbs of the user are substantially positioned on the middle keys in the key columns of the keypad structure 120 when the user is holding the electronic device 100 naturally. Therefore, the keys except for the middle key in each key column are not so easy to press as the middle keys. Preferably, the key area of the middle key in each key column of the keypad structure 120 is smaller than the key area of the other keys in the same key column. In other words, the keys above and below the middle key in each key column have larger key areas. For example, the key column of the left key group 121, which is composed of the keys 2, W, S, X, and Alt, has key S in the middle area; the remaining keys, i.e. the key 2, W, X, and Alt, have larger key areas than the key S. Keys with larger areas are not only easier for the thumbs to press but also enhance the convenience and accuracy of input.

The upper portion of the keypad structure 120 is more difficult for the thumbs to reach and press than the lower portion of the keypad structure 120. The problem stated above can be solved by appropriately designing the boundary shape of the keypad structure 120, which is elaborated below. As shown in FIG. 1, the left-most key group 124 has an upper boundary 124a; the left key group 121 has an upper boundary 121a; the central key group 122 has an upper boundary 122a; the right key group 123 has an upper boundary 123a; and the right-most key group 125 has an upper boundary 125a. Preferably, The upper boundaries 124a, 121a, 122a, 123a, and 125a connect sequentially and form a curved line 126. Preferably, the positions of the upper boundaries 121a and 123a are higher than the position of the upper boundary 122a. Also, the position of the upper boundary 124a is higher than the position of the upper boundary 121a, and the position of the upper boundary 125a is higher than the position of the upper boundary 123a. As such, the curved line 126 matches the natural movement of the thumbs.

Figure 2:
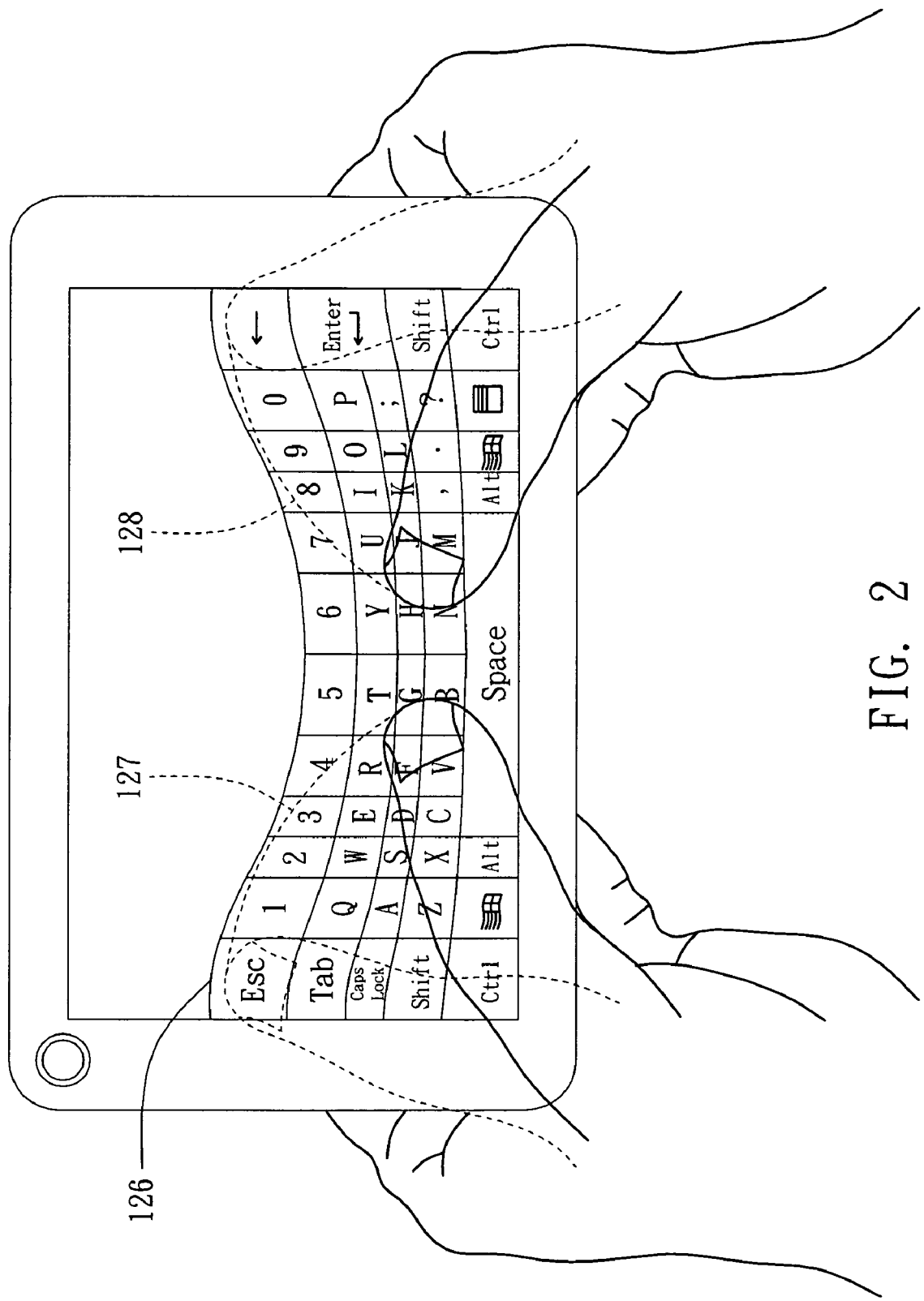
FIG. 2 is a diagram showing the electronic device in FIG. 1 being held in the hands.

FIG. 2 shows a diagram of the electronic device in FIG. 1 being held in the hands. As the left thumb of the user moves from the key G to the key Esc, it moves along a curved path 127. When the right thumb moves from the key H to the key ←, it moves along a curved path 128. Since the curved line 126 is designed according to the curved paths 127 and 128, the left and right thumbs can easily press the keys Esc, 1, 5, 6, 0, ← etc when move on the keypad structure 120. The keypad structure 120 is an ergonomic design; the convenience and accuracy of input are enhanced.

Figure 3:
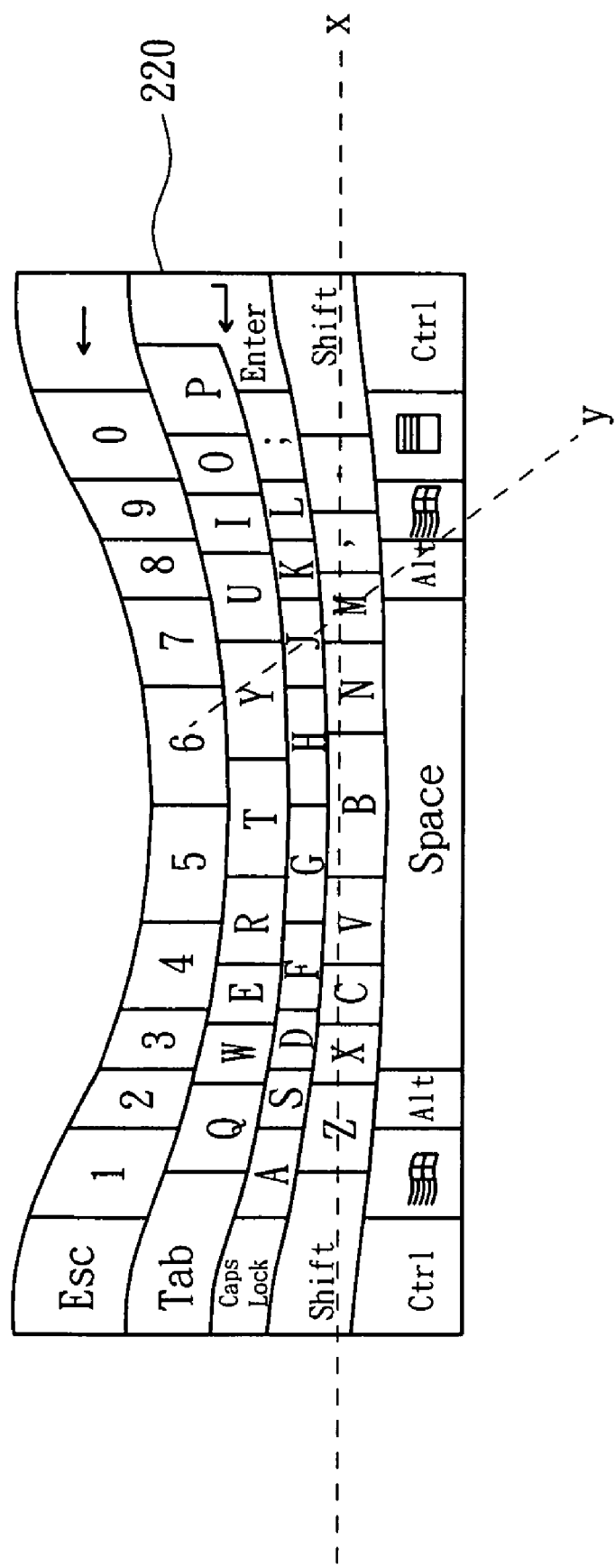
FIG. 3 is a diagram showing a keypad structure with the keys in a staggered arrangement.

The keys of each key column in the keypad structure 120 are aligned strictly vertically; however, the keypad structure of the invention is not limited thereto. For example, FIG. 3 shows a diagram of a keypad structure with the keys in a staggered arrangement. The keys of the keypad structure can be arranged staggered so that the column directions and row directions are not necessarily perpendicular. As shown in FIG. 3, the keys C, V, B, and N are arranged along the direction x and the keys 6, Y, J, and M are arranged in a non-perpendicular direction y.

The electronic device 100 can be a laptop computer, a tablet computer, a personal digital assistance (PDA) or an ultra-mobile personal computer (UMPC). Preferably, the electronic device 100 is a handheld device, portable device, or any other kind of electronic device that has the main body 110 and the keypad structure 120. Also, the display 130 is a touchpad display and the keypad structure 120 is a virtual keypad shown in the touchpad display for the purpose of illustration in the preferred embodiment, the keypad structure 120 can be a rigid keypad or a foldable keypad in other embodiments of the invention.

The keypad structure and the electronic device using the same disclosed above have keys with larger key areas to provide the user with more convenience, accuracy, and comfort. The upper boundary of the keypad structure is a curved line, which matches the natural movement of the thumbs so that the user can press the keys more smoothly. Moreover, the keys of the keypad structure are arranged according to the standard QWERTY keyboard, which provides a familiar layout for the user. The keypad structure is continuous and symmetrical, so the keypad structure has high integrity and better aesthetic appearance.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A keypad structure used in an electronic device, comprising:
    a first key group;
    a second key group disposed on the left side of the first key group; and
    a third key group disposed on the right side of the first key group;
    wherein each of the second key group, the first key group and the third key group comprises a plurality of keys arranged in an array, the array comprises a plurality of key columns and rows, and each key area of the keys in a middle row of each key array is the smallest of the array, and a single key area of each key of the second key group and the third key group is smaller than a single key area of each key of the first key group in the same row.

2. The keypad structure according to claim 1, further comprising:
    a fourth key group disposed on the left side of the second key group, wherein each key area of the fourth key group is larger than each key area of the second key group.

3. The keypad structure according to claim 1, further comprising:
    a fifth key group disposed on the right side of the third key group, wherein each key area of the fifth key group is larger than each key area of the third key group.

4. The keypad structure according to claim 1, wherein the keys are arranged according to a standard QWERTY keyboard.

5. The keypad structure according to claim 1, wherein upper boundaries of the second key group, the first key group, and the third key group form a curved line.

6. The keypad structure according to claim 5, wherein the position of the upper boundary of the first key group is lower than the positions of the upper boundaries of the second key group and the third key group.

7. The keypad structure according to claim 1, wherein the first key group adjoins the second key group and the third key group.

8. The keypad structure according to claim 1, wherein the keys are arranged along a plurality of column directions and a plurality of row directions, and at least one of the row directions is not perpendicular to the column directions.

9. The keypad structure according to claim 1, wherein the keypad structure comprises a rigid keypad or a keypad shown in a touchpad display.

10. An electronic device, comprising:
    a main body; and
    a keypad structure disposed on the main body, having:
    a first key group;
    a second key group disposed on the left side of the first key group; and
    a third key group on the right side of the first key group;
    wherein each of the second key group, the first key group and the third key group comprises a plurality of keys arranged on an array, the array comprises a plurality of key columns and rows, and each key area of the keys in a middle row of each key array is the smallest of the array, and a single key area of each key of the second key group and the third key group is smaller than a single key area of each key of the first key group in the same row.

11. The electronic device according to claim 10, wherein the keypad structure further comprises a fourth key group disposed on the left side of the second key group, wherein each key area of the fourth key group is larger than each key area of the second key group.

12. The electronic device according to claim 11, wherein the keypad structure further comprises a fifth key group on the right side of the third key group, wherein each key area of the fifth key group is larger than each key area of the third key group.

13. The electronic device according to claim 10, wherein upper boundaries of the second key group, the first key group and the third key group form a curved line.

14. The electronic device according to claim 13, wherein the position of the upper boundary of the first key group is lower than the positions of the upper boundaries of the second key group and the third key group.

15. The electronic device according to claim 10, wherein the first key group adjoins the second key group and the third key group.

16. The electronic device according to claim 10, wherein the keys are arranged along a plurality of column directions and a plurality of row directions, and at least one of the row directions is not perpendicular to the column directions.

17. The electronic device according to claim 10, wherein the keypad structure is a rigid keypad.

18. The electronic device according to claim 10, further comprising:
    a touchpad display disposed on the main body, and wherein the keypad structure is a keypad shown in the touchpad display.

* * * * *